United States Patent [19]
Tanaka et al.

[11] Patent Number: 6,163,646
[45] Date of Patent: Dec. 19, 2000

[54] APPARATUS FOR A SYNCHRONIZED PLAYBACK OF AUDIO-VIDEO SIGNALS

[75] Inventors: Mitsumasa Tanaka; Takashi Sameshima; Masaru Terashima; Hideki Sawada, all of Tokyo, Japan

[73] Assignee: NEC Corporation, Tokyo, Japan

[21] Appl. No.: 08/959,196

[22] Filed: Oct. 28, 1997

[30] Foreign Application Priority Data

Oct. 29, 1996 [JP] Japan ................................ 8-287075

[51] Int. Cl.$^7$ .................................................. H04N 5/76
[52] U.S. Cl. .............................. 386/96; 386/98; 386/111; 386/112
[58] Field of Search ..................... 348/423, 845.1–845.3, 348/362, 464, 515, 500; 386/52, 54, 66, 98, 111–112, 125–126, 96, 848; 358/136, 335; 352/12

[56] References Cited

U.S. PATENT DOCUMENTS

| | | | |
|---|---|---|---|
| 4,546,386 | 10/1985 | Matsumoto et al. | 358/136 |
| 5,287,182 | 2/1994 | Haskell et al. | 348/500 |
| 5,430,485 | 7/1995 | Lankford et al. | 348/423 |
| 5,502,573 | 3/1996 | Fujinami | 358/339 |
| 5,508,816 | 4/1996 | Ueda et al. | 358/341 |
| 5,537,148 | 7/1996 | Fujinami | 348/473 |
| 5,559,999 | 9/1996 | Maturi et al. | 395/550 |
| 5,565,996 | 10/1996 | Ueda | 386/1 |
| 5,583,652 | 12/1996 | Ware | 386/75 |
| 5,617,502 | 4/1997 | Ort et al. | 386/97 |
| 5,642,171 | 6/1997 | Baumgartner et al. | 348/515 |
| 5,664,044 | 9/1997 | Ware | 386/75 |
| 5,808,722 | 9/1998 | Suzuki | 352/12 |
| 5,913,031 | 6/1999 | Blanchard | 395/200 |

FOREIGN PATENT DOCUMENTS

| | | |
|---|---|---|
| 648 056 | 4/1995 | European Pat. Off. . |
| 681 398 | 11/1995 | European Pat. Off. . |
| 7-107514 | 4/1995 | Japan . |
| 7-170490 | 7/1995 | Japan . |
| 7-303240 | 11/1995 | Japan . |
| 8-251543 | 9/1996 | Japan . |
| 95-10508 | 4/1995 | Rep. of Korea . |
| 96/19076 | 9/1996 | WIPO . |

*Primary Examiner*—Thai Tran
*Attorney, Agent, or Firm*—Foley & Lardner

[57] ABSTRACT

To provide an apparatus for a synchronized playback of compressed digital data of audio-video signals with a simple configuration to be applied to a system having comparatively low data processing ability, independent of resolution of a software timer of the system, the apparatus of the invention obtains a reference time indicating reproduction time passage of the audio signal component from reproduced data amount of the audio signal component, and detects progress of the video signal component in reference to the reference time.

5 Claims, 5 Drawing Sheets

APPARATUS FOR A SYNCHRONIZED PLAYBACK OF AUDIO-VIDEO SIGNALS

BACKGROUND OF THE INVENTION

The present invention relates to an apparatus for synchronized playback of audio-video (hereafter abbreviated as AV) signals, wherein compressed digital data of AV signals are decompressed into a video signal component and an audio signal component to be represented in synchronization with each other.

In the synchronized playback of AV signals, compressed digital data of AV signals read out from recording media such as a CD-ROM (Compact Disk Read Only Memory) or a hard disk device are decompressed before being represented through output devices such as a CRT monitor and a speaker. When the apparatus for the synchronized playback is provided with data processing ability sufficiently high for the data decompression of the AV signals, or when video signal size of the compressed digital data is comparatively small, the data decompression of both of the video signal component and the audio signal component can be performed within a short time, and so, audio data and video frames can be reproduced without interruption.

However, when the data processing ability of the apparatus is not sufficiently high compared to the video signal size of the compressed digital data, the apparatus can not reproduce both the audio signal component and the video signal component in real time with which they are recorded originally, taking too much time for the data decompression processes. In consequence, the video signal component may be represented as a slow-motion film and the audio signal component is reproduced intermittently.

The intermittent reproduction of the audio signal component gives a sense of intense incongruity to the human hearing. Therefore, the audio signal component is usually processed to be reproduced continuously with a priority over the video signal component. The data decompression and displaying process of the video signal component is performed when the audio signal component is not processed. Here, adequate thin down of the picture frames (so-called frame omission) becomes necessary for synchronizing the reproduction timings of the audio signal component and the video signal component so that the video signal component may not be delayed from the audio signal component.

As for the digital data compression, there is known an MPEG (Motion Picture Experts Group) standard, wherein the audio signal component and the video signal component of the AV signals are multiplexed and compressed into digital data each added with timing information indicating reproduction time of each thereof. By referring to the timing information, the audio signal component and the video signal component are reproduced in synchronization in the decompression procedure.

As a prior art technique of the synchronized playback of the audio (voice) signal component and the video (picture) signal component, there is, for example, a Japanese patent application entitled "An apparatus for compression and reproduction of AV signals" and laid open as a Provisional Publication No. 107514/'95 (hereafter called the first prior art apparatus).

In the first prior art apparatus, color difference information is thinned down in a video data compression procedure considering the processing speed of the reproduction apparatus. Compensating the thinned down color difference information by simple interpolation, the decompression procedure of the video data is performed at a high speed, enabling synchronized reproduction of the video data and the audio data.

In another Japanese patent application entitled "Variable speed synchronized playback of recorded digital audio and video data" and laid open as a Provisional Publication No. 303240/'95 (hereafter called the second prior art apparatus), there is proposed another method of synchronized playback with a variable speed of the audio signal component and the video signal component.

In this method, a time required for decompression and playback of a frame of the video signal component, and a time required for decompression and reproduction of a block of the audio signal component are calculated from respective attribute information of each thereof. One of the calculated times is used as a master time clock for decompession of the audio signal component and the video signal component. The audio signal component and the video signal component are decompressed more speedily or more slowly according to a scaling factor of the master time clock indicated by a user.

A problem of the first prior art apparatus is that feedback control means for the synchronization are not provided. In the first prior art apparatus, the thinning down of the color difference information is performed a priori in the data compression procedure according to the information amount of the video signal component to be processed, and no means are provided for detecting lead or lag of a displayed video frame to the corresponding audio data. Therefore, unnecessary thinning down of color difference information is performed even when the playback apparatus is provided with sufficient data processing ability, and restoration of the lead or lag of the video signal component to the audio signal component can not be performed flexibly, in the first prior art apparatus.

A problem of the second prior art apparatus is that a TDHS (Time Domain Harmonic Scaling) system is used for synchronizing reproduction of the audio signal component to the scaled master time clock. The TDHS system needs a little complicated processing inconvenient to be applied to the playback system with low data processing ability, without saying of the distortion of the audio signal component.

Furthermore, when the playback apparatus is implemented with software operating on an operating system with a low resolution software timer, there is a problem that correct synchronization between the audio signal component and the video signal component cannot be obtained because of the low resolution of the software timer, even if the feedback control means are provided. That is, when the resolution of the software timer is 10 ms and decompression process of the audio signal component corresponding to one frame of the video signal component having 30 frames per second takes 13 ms, for example, decompression process of the audio signal component is measured to be accomplished in 10 ms, and 23 ms is allotted for decompression process of the video signal component of one frame. Therefore, a delay of 3 ms par frame is derived in the reproduction of the video signal component.

This is another problem of the prior art apparatus.

SUMMARY OF THE INVENTION

Therefore, a primary object of the present invention is to provide an apparatus for a synchronized playback of audio-video signals with a simple configuration to be applied to a system having comparatively low data processing ability such as a personal computer, wherein the video signal component can be decompressed and reproduced in synchronization with the audio signal component adequately from the compressed digital data according to the data processing ability of the system, independent of resolution of the software timer of the system.

In order to achieve the object, an apparatus for synchronized play-back of audio-video signals of the invention, for representing an audio signal component and a video signal component in synchronization with each other by decompressing compressed digital data of the audio signal component and the video signal component, comprises;

means for obtaining a reference time indicating reproduction time passage of the audio signal component from reproduced data amount of the audio signal component, a video frame counter for counting and maintaining a real frame number of the video signal component which indicates a sum of a frame number actually decompressed and a frame number omitted to be decompressed, a delay detector for calculating an ideal frame number of the video signal component to be displayed originally from the reference time, and detecting progress of the video signal component by comparing the real frame number to the ideal frame number, and means for restoring difference of display timing of the video signal component from the reference time by performing frame omission and decompression waiting of the video signal component according to the progress of the video signal component.

Therefore, the video signal component can be decompressed and reproduced in synchronization with the audio signal component adequately from the compressed digital data with a simple configuration according to the data processing ability of a system wherein the apparatus of the invention is applied, independent of resolution of the software timer of the system, without needing any special hardware timer.

BRIEF DESCRIPTION OF THE DRAWINGS

The foregoing, further objects, features, and advantages of this invention will become apparent from a consideration of the following description, the appended claims, and the accompanying drawings wherein the same numerals indicate the same or the corresponding parts.

In the drawings.

DETAILED DESCRIPTION OF THE PREFERRED EMBODIMENTS

Now, embodiments of the present invention will be described in connection with the drawings.

Figure 1:
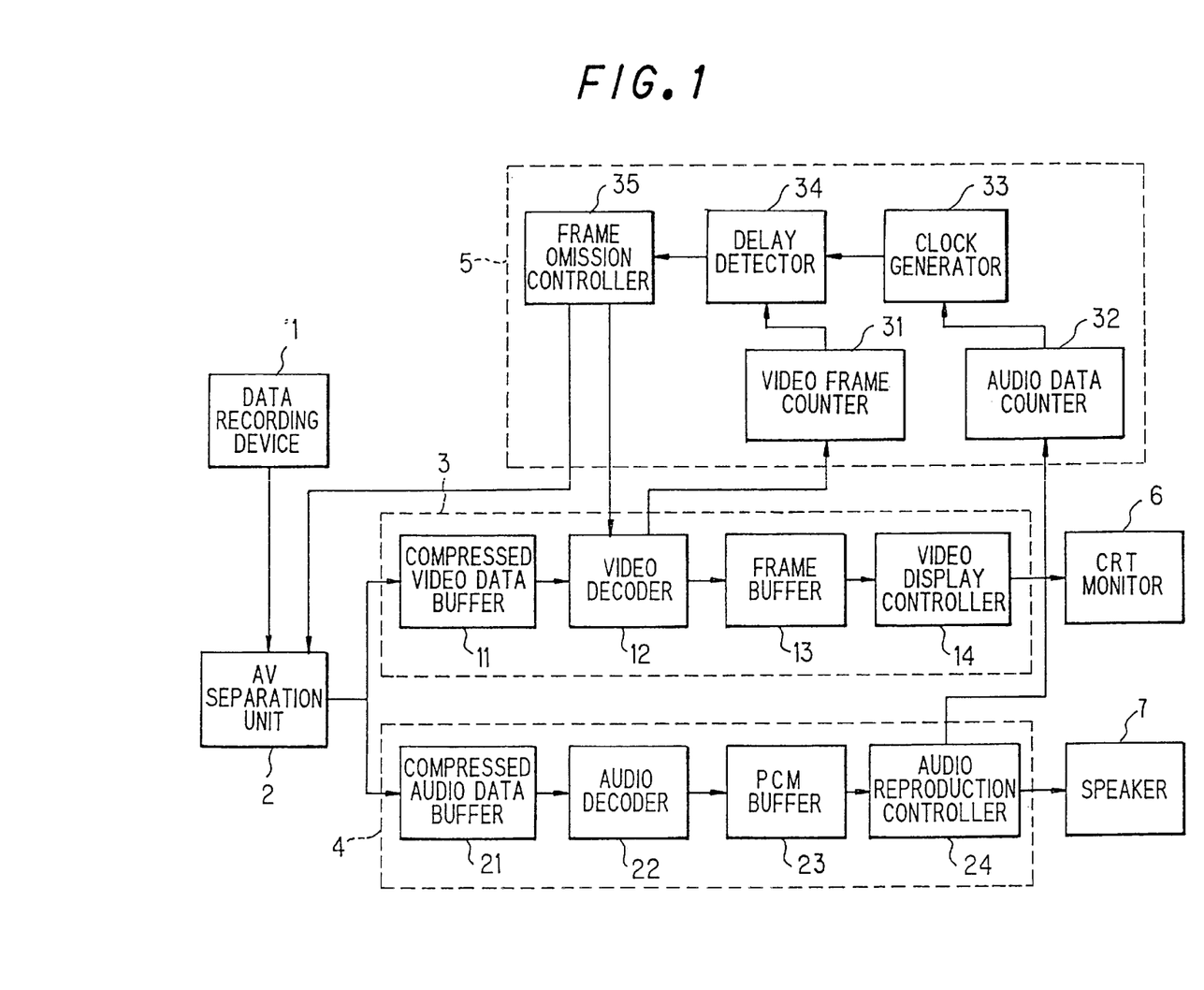
FIG. 1 is a block diagram illustrating a fundamental configuration of an apparatus for a synchronized playback of audio-video signals according to an embodiment of the invention.

FIG. 1 is a block diagram illustrating a fundamental configuration of an apparatus for a synchronized playback of AV signals according to an embodiment of the invention.

Referring to FIG. 1, the apparatus comprises;

a data recording device 1 for storing compressed digital data of AV signals, an AV separation unit 2 for extracting an audio signal component and a video signal component multiplexed in the compressed digital data read out of the data recording device 1, a video signal processor 3 for performing decompression of the video signal component extracted by the AV separation unit 2, an audio signal processor 4 for performing decompression of the audio signal component extracted by the AV separation unit 2, an AV synchronization controller 5 for performing synchronization control between the audio signal component and the video signal component, a CRT monitor 6 for displaying the video signal component, and a speaker 7 for reproducing the audio signal component.

The video signal processor 3 includes;

a compressed video data buffer 11 for storing compressed data of the video signal component extracted by the AV separation unit 2, a video decoder 12 for decompressing the compressed data of the video signal component buffered in the compressed video data buffer 11 by analyzing attribute information (video header information) thereof, a frame buffer 13 for buffering frame data of the video signal component decompressed by the video decoder 12, and a video display controller 14 for generating display signals to be supplied to the CRT monitor 6 by reading out the frame data prepared in the frame buffer 13 in synchronization with synchronous signals for the CRT monitor 6.

The audio signal processor 4 includes;

a compressed audio data buffer 21 for storing compressed data of the audio signal component extracted by the AV separation unit 2, an audio decoder 22 for decompressing the compressed data of the audio signal component buffered in the compressed audio data buffer 21 by analyzing attribute information (audio header information) thereof, a PCM buffer 23 for storing data of the audio signal component decompressed by the audio decoder 22, and an audio reproduction controller 24 for generating sound signals to be supplied to the speaker 7 according to the data of the audio signal component supplied from the PCM buffer 23.

The AV synchronization controller 5 includes;

a video frame counter 31 for counting and maintaining a real frame number of the video signal component which indicates a sum of a frame number actually decompressed and a frame number omitted to be decompressed by the video decoder 12, from the beginning of reproduction, an audio data counter 32 for counting and maintaining data amount of the audio signal component actually decompressed and reproduced by the audio reproduction controller 24 from the beginning of reproduction according to reproduction information supplied from the audio reproduction controller 24, a clock generator 33 for calculating a reference time indicating reproduction time passage of the audio signal component from the data amount counted by the audio data counter 32 referring to the audio header information analyzed by the audio decoder 22, a delay detector 34 for calculating an ideal frame number of the video signal component to be displayed originally from the reference time calculated by the clock generator 33 referring to the video header information analyzed by the video decoder 12, and detecting lead or lag of the video signal component to the audio signal component by comparing the ideal frame number and the real frame number counted by the video frame counter 31, and a frame omission controller 35 for performing the frame omission when the video signal component is delayed from the audio signal component according to the lead or lag detected by the delay detector 34 referring to priority of frames to be decompressed.

In other words, the video frame counter 31 of the AV synchronization controller 5 operates as means for counting the real frame number of the video signal component actually processed (decompressed or omitted), and the audio data counter 32 and the clock generator 33 operate as means for obtaining the reference time indicating reproduction time passage of the audio signal component, as will be described afterwards, independent of a software timer of the system which may not available for correct synchronization because of its insufficient resolution.

Further, the delay detector 34 operates as means for calculating the ideal frame number of the video signal component to be decompressed and displayed originally in an interval indicated by the reference time, as well as operating as means for detecting progress of the video signal component in reference to the reference time, that is, detecting the lead or lag of the video signal component to the audio signal component by comparing the ideal frame number and the real frame number. And the frame omission controller 35 operates as means for restoring the lead or lag of display timing of the video signal component to reproduction timing of the audio signal component by indicating the frame omission or decompression waiting of the video signal component to the video decoder 12, according to the progress of the video signal component detected by the delay detector 34.

Here, the frame omission is performed according to the order of priority of frames as will be described in the following paragraphs, and the decompression waiting is performed when a lead of the video signal component is detected by the delay detector 34 until the audio signal component overtakes the video signal component.

Now, the order of priority of frames is described.

Figure 2:
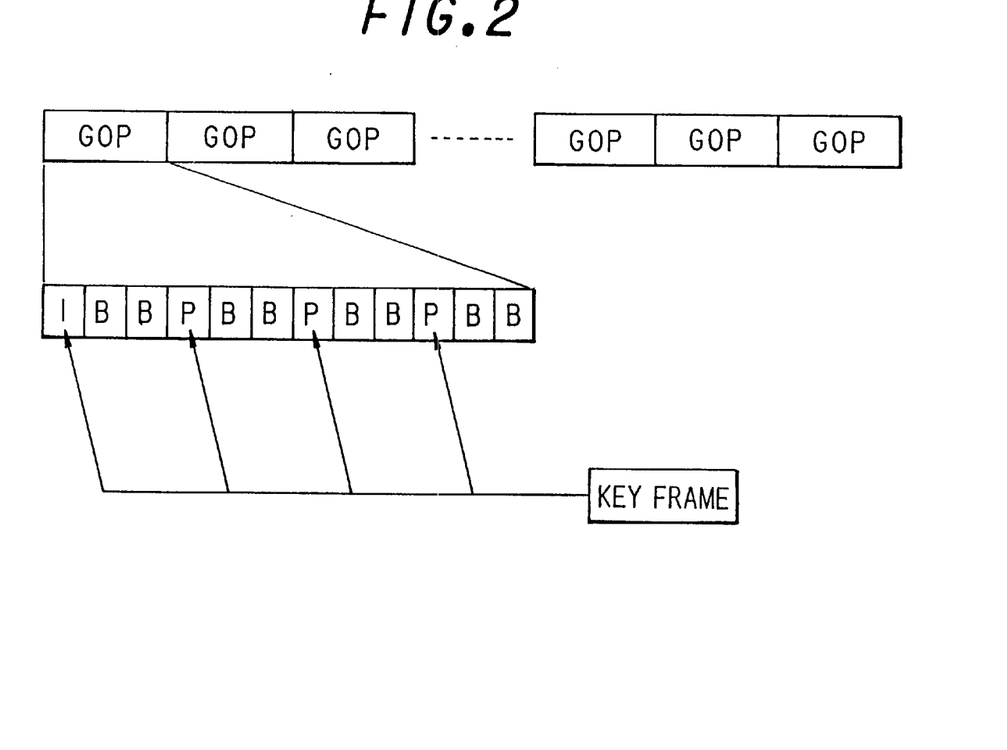
FIG. 2 is a schematic diagram illustrating an example of data stream of the video signal component subjected to frame omission.

FIG. 2 is a schematic diagram illustrating an example of data stream of the video signal component subjected to the frame omission performed by the frame omission controller 35. In the example, frame data of the video signal component are ranged according to an inter-frame prediction coding system such as the MPEG standard, for example.

Referring to FIG. 2, the data of the video signal component has a frame composition comprising a plurality of GOP (Group Of Pictures) data, each including data of I (Intra), P (Predictive) and B (Bidirectionally predictive) pictures. The I-picture, coded from intra-frame data, can be decompressed independently from itself without any key frame, and is used as a key frame to be referred to when following frames are decompressed. The P-picture, coded according to forward prediction, is decompressed referring to a preceding key frame. The P-picture is also used as a key frame to be referred to when following and preceding frames are decompressed. The B-picture, coded according to bi-directional prediction, is decompressed referring to a preceding key frame and a following key frame, being referred to by no other frame.

The key frame is a picture to be referred to when other pictures are decompressed, and so, when a key frame is omitted to be decompressed, following P and B-pictures until a next I-picture appears should be also omitted, unable to be decompressed.

Therefore, the frame omission priority is attributed to the B-picture, the P-picture and the I-picture, in the order.

Figure 3:
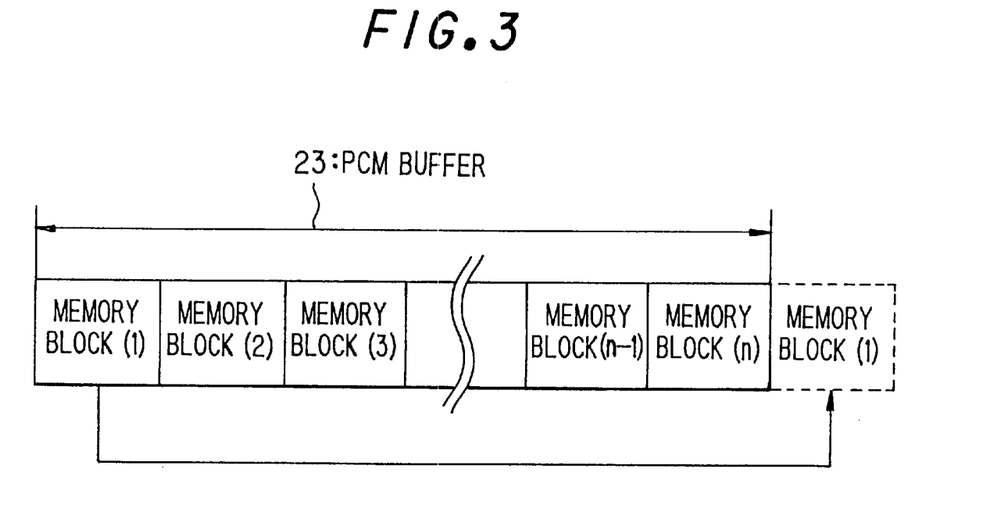
FIG. 3 is a schematic diagram illustrating the PCM buffer 23 of FIG. 1 for storing the data of the audio signal component to be reproduced.

Now, the PCM buffer 23 for storing the data of the audio signal component to be reproduced is described referring to a schematic diagram of FIG. 3.

The PCM buffer 23 operates as a ring buffer comprising a plurality of memory blocks (1) to (n), wherein the data of the audio signal component decompressed by the audio decoder 22 are stored to be read out and supplied to the audio reproduction controller 24 in turns cyclically to be reproduced.

When reproduction by the audio reproduction controller 24 of data read out and transferred from a memory block of the PCM buffer 23 is accomplished, an interruption is occurred and data in next memory block is transferred to the audio reproduction controller 24 to be reproduced. The audio decoder 22 decompresses the audio signal component to be stored in the next memory block which is read out, interrupting processing of the video signal component even when the video signal component is under processing. For example, when reproduction of data of the memory block (1) of FIG. 3 is accomplished, data of the memory block (2) is read out, transferred to the audio reproduction controller 24 and begins to be reproduced. In the memory block (1), data of the audio signal component newly decompressed by the audio decoder 22 is stored to be read out after reproduction of data of the memory block (n) is accomplished.

Thus, the audio signal component is decompressed with the interruption processing prior to other procedure such as the decompression process of the video signal component, in the embodiment. Therefore, the audio signal component can be reproduced without interruption, and accordingly, a precise reproduction time can be obtained from reproduction progress of the audio signal component at the audio reproduction controller 24.

Figure 4:
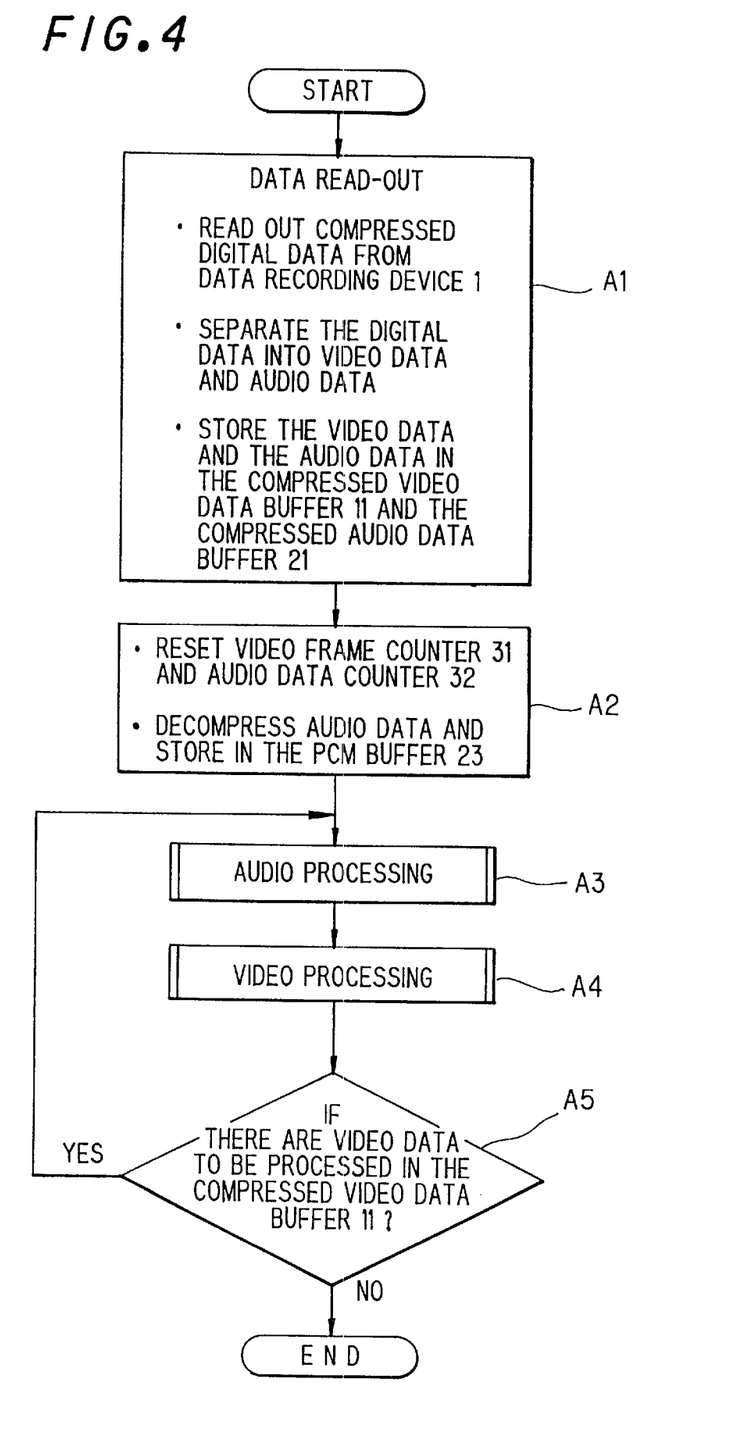
FIG. 4 is a flowchart illustrating main processes of the embodiment of FIG. 1.
Figure 5:
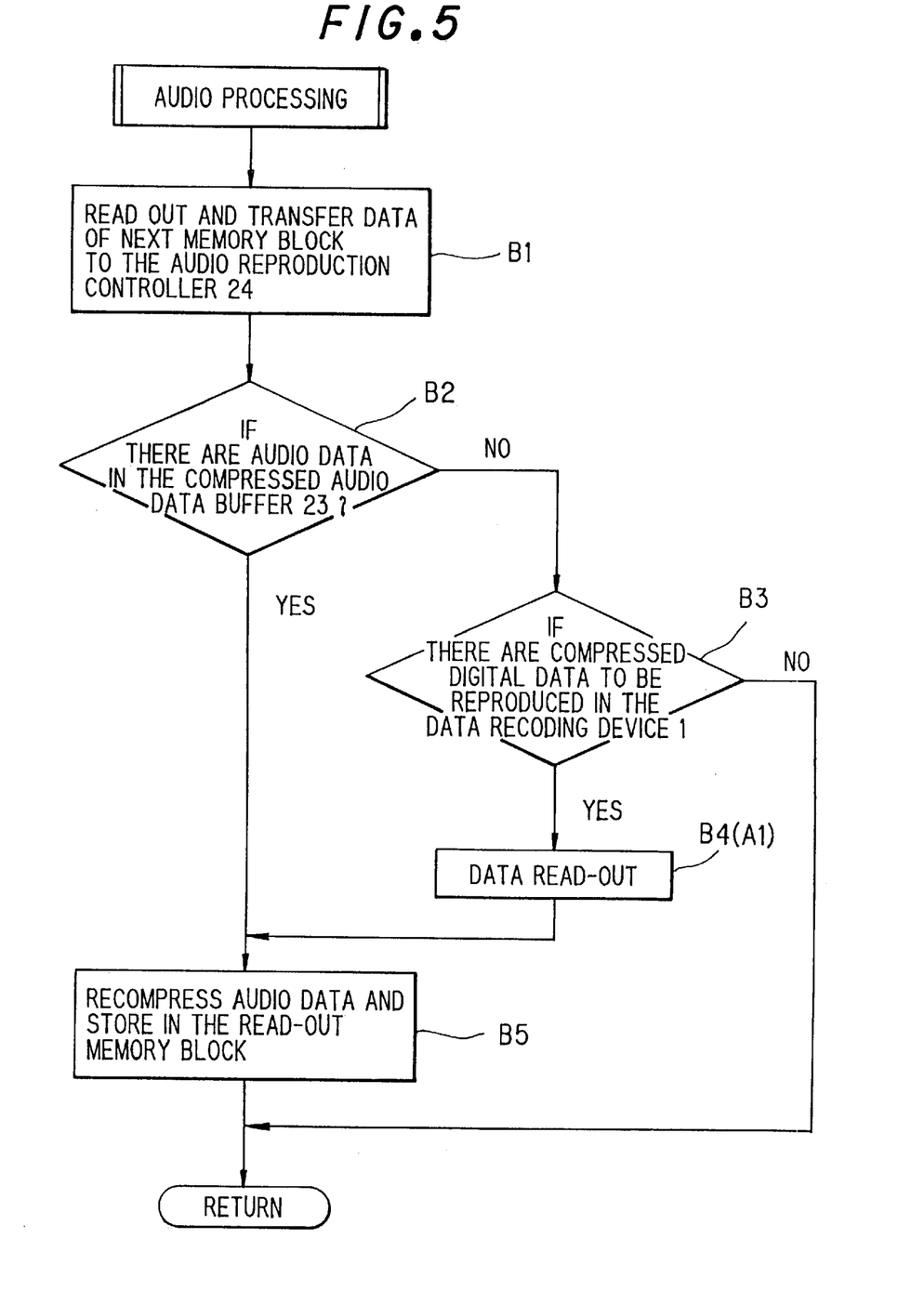
FIG. 5 is a flowchart illustrating details of the audio processing performed by an interruption at step A3 of FIG. 4.
Figure 6:
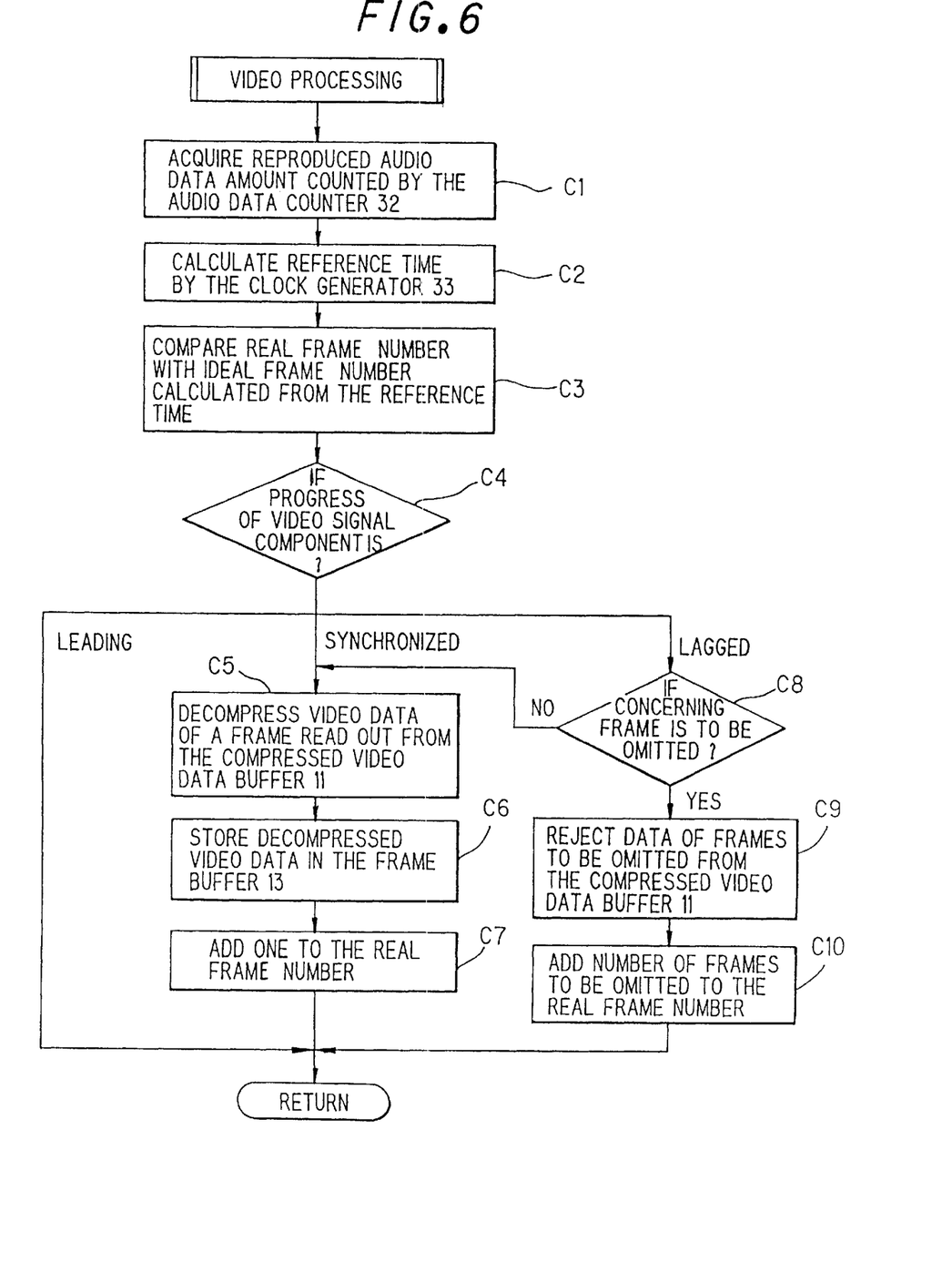
FIG. 6 is a flowchart illustrating details of the video processing performed at step A4 of FIG. 4.

Now, operation of the synchronized playback of AV signals in the embodiment of FIG. 1 is described referring to flowcharts of FIGS. 4 to 6.

FIG. 4 is a flowchart illustrating main processes of the embodiment.

As initializing procedure, data read-out (at step A1) and audio data decompression (at step A2) are performed at the beginning of reproduction of AV signals.

At step A1, a block of multiplexed digital data of compressed AV signals is read out from the data recording device 1, and separated into compressed data of the video signal component and those of the audio signal component, which are stored in the compressed video data buffer 11 and the compressed audio data buffer 21, respectively. Then, at step A2, the video frame counter 31 and the audio data counter 32 are reset, and audio data decompression is executed, wherein compressed data of the audio signal component to be prepared in all the memory blocks of the PCM buffer 23 are read out from the compressed audio data buffer 21 and decompressed referring to the audio header information therein.

After the initialization procedure, audio processing (at step A3) and the video processing (at step A4) are repeated until it is detected (at step A5) that there is left no compressed data to be processed in the compressed video data buffer 11. Here, in FIG. 4, the audio processing of step A3 and the video processing at step A4 are depicted to be performed sequentially. However, in the embodiment, the audio processing at step A3 is performed whenever an interruption occurs for the audio data processing, as beforehand described, interrupting the video processing at step A4 even when it is under execution at the time.

FIG. 5 is a flowchart illustrating details of the audio processing performed by an interruption at step A3 of FIG. 4.

When there is no data in the audio reproduction controller 24, an interruption is occurred and data of a first/next memory block in the PCM buffer 23 are read out and transferred to the audio reproduction controller 24 (at step B1), which are converted into analog signals to be supplied to the speaker 7 according to a sampling frequency indicated by the audio header information. Then (at step B5), the compressed data of the audio signal component are read out from the compressed audio data buffer 21, decompressed by the audio decoder 22 and stored in the first/next memory block which is read out, on condition that there are compressed data left to be processed in the compressed audio data buffer 21. Then, the audio processing returns, waiting a next interruption. When it is detected (at step B2) that there is no compressed data to be processed in the compressed audio data buffer 21, the data read-out at step B4 is performed in the same way with step A1 described in connection with the initialization procedure of FIG. 4, on condition it is detected (at step B3) that there are compressed digital data of AV signals left to be reproduced in the data recording device 1. When there is detected no compressed digital data of AV signals left to be reproduced in the data recording device 1, only the data read-out and transfer at step B1 is performed for each interruption until data of all the memory blocks in the PCM buffer 23 are transferred to the audio reproduction controller 24.

Thus, the audio signal component is reproduced without interruption, in the embodiment.

Now, details of the video processing at step A4 of FIG. 4 is described referring to the flowchart of FIG. 6, wherein the synchronization control and decompression of the video signal component are performed.

First (at step C1), the data amount of the audio signal component actually decompressed and reproduced by the audio reproduction controller 24 from the beginning of reproduction is acquired from the audio data counter 32. Then (at step C2), the reference time indicating the reproduction time passage of the audio signal component is calculated by the clock generator 33 from the data amount referring to the audio header information obtained at step A2 of FIG. 4, as follows.

When the audio header information indicates audio data of Layer I, bit rate of 192,000 bits/sec, sampling frequency of 44.1 KHz and 2-channel stereo signal, for example, 2 channels of analog signals are generated by the audio reproduction controller 24 from 2×16 bits×441,000/sec of the decompressed data supplied from the PCM buffer 23. Therefore, when the data amount of D bytes is acquired from the audio counter 32, the reference time T is calculated as $T(sec)=D\times 8/(44,100\times 2\times 16)$.

Thus, the reference time T is calculated according to the data amount D counted by the audio data counter 32 from the reproduction information supplied from the audio reproduction controller 24, independent of the software timer of the system without needing any special hardware timer, in the embodiment.

By multiplying the reference time T by frame rate of 30 frames/sec, for example, indicated by the video header information, the ideal frame number $FI=30T$ is obtained, which is compared to the real frame number FR (at step C3) by calculating progress $PR=FR-FI$ of the video signal component.

When the progress $PR=0$, the video signal component is synchronized to the audio signal component, while it is leading when the progress PR is positive and lagged when the progress PR is negative. However, when the decompression waiting or the frame omission is performed directly according to positive/negative of the progress PR, the control becomes unstable. Therefore, a threshold range is preferably provided for the synchronization discrimination. In the embodiment, when $-4<$the progress $PR<1$, the video signal component is discriminated to be synchronized to the audio signal component (at step C4), considering the fact that the lead of the video signal component gives a sense of more incongruity than the lag thereof.

Returning to FIG. 6, when the ideal frame number FI is 10 and the real frame number FR is 11, for example, the video signal component is discriminated to be leading the audio signal component, the progress PR being one, and control of the video processing returns directly from step C4. The video processing of step A4 of FIG. 4, that is, steps C1 to C4 of FIG. 6 are repeated (including the audio processing of step A3, when there is an interruption) until the progress PR becomes less than one, the ideal frame number becoming more than 11, in the example. Thus, the decompression waiting is performed in the embodiment.

When the ideal frame number FI is 10 and the real frame number is 8, for example, the video signal component is discriminated to be synchronized with the audio signal component, the progress PR being $-2$. In the case, the control goes to step C5 from step C4. Compressed data of a frame are read out from the compressed video data buffer 11, decompressed by the video decoder 12 and stored in the frame buffer 13 (at step C6) to be displayed on the CRT monitor 6 by the video display controller 14. Then (at step C7), the real frame number FR is added with one, and the control returns.

When the ideal frame number FI is 10 and the real frame number is 5, for example, the video signal component is discriminated to be lagged from the audio signal component, the progress PR being $-5$. In this case, the control goes to step C8, where the omission priority of the concerning frame is checked. In the embodiment, the frame omission is set not to be performed for the I and the P-picture, the control going to step C5 in the case for performing the decompression of the concerning frame. If it is the B-picture, the control goes to step C9 for rejecting data of the concerning frame from the compressed data buffer 11, and the real frame number is added with one at step C10 in the same way with step C7.

Thus, the synchronized play back of the AV signals is performed in the embodiment.

Here, the frame omission is described to be performed only for B-pictures. However, the frame omission may be set to be performed for the P or I-frames too, by providing a second and a third threshold value according to the omission priority, for example, when the progress PR is lower than the second and the third threshold value. In the case, data of the compressed video data buffer 11 are to be rejected until data of next I-frame at step C9 and the real frame number FR is to be added at step C10 with a number of frames rejected at step C9.

As heretofore described, the synchronization control of the AV signals is performed according to the data amount D counted by the audio data counter 32 from the reproduction information supplied from the audio reproduction controller 24 in the embodiment, and so, the video signal component can be decompressed and reproduced in synchronization with the audio signal component adequately from the compressed digital data with a simple configuration, independent of resolution of the software timer of a system wherein the apparatus of the embodiment is applied, without needing any special hardware timer.

The audio signal component is processed with a priority to be reproduced without any interruption, and even when the frame omission is necessary, it is performed according to priority of frames, enabling a smooth presentation of the video signal component, and eliminating unnecessary frame omission according to the data processing ability of the system.

What is claimed is:

1. An apparatus for synchronized playback of audio-video signals for representing an audio signal component and a video signal component in synchronization with each other by decompressing compressed digital data of the audio signal component and the video signal component, said apparatus comprising:

means for obtaining a reference time indicating reproduction time passage of the audio signal component from reproduced data amount of the audio signal component; and means for detecting progress of the video signal component in reference to said reference time.

2. The apparatus for synchronized playback of audio-video signals recited in claim 1, said means for detecting progress of the video signal component having:

a video frame counter for counting and maintaining a real frame number of the video signal component which indicates a sum of a frame number actually decompressed and a frame number omitted to be decompressed; and a delay detector for calculating an ideal frame number of the video signal component to be displayed originally from said reference time, and detecting said progress of the video signal component by comparing said real frame number to said ideal frame number.

3. The apparatus for synchronized playback of audio-video signals recited in claim 1, further comprising means for restoring difference of display timing of the video signal component from said reference time by performing frame omission and decompression waiting of the video signal component according to said progress of the video signal component.

4. The apparatus for synchronized playback of audio-video signals recited in claim 3; wherein said frame omission is performed according to an order of priority attributed to frames of the video signal component subject to said frame omission in connection with kinds of compressed data of said frames.

5. The apparatus for synchronized playback of audio-video signals recited in claim 3; wherein said decompression waiting is performed by controlling decompression of compressed data of a frame of the video signal component to wait until said difference of display timing of said frame from said reference time becomes within a threshold value.

* * * * *